United States Patent [19]
Glennon et al.

[11] Patent Number: 4,739,466
[45] Date of Patent: Apr. 19, 1988

[54] REGULATED AC/DC CONVERTER

[75] Inventors: Timothy F. Glennon, Rockford; Byron R. Mehl, Belvidere, both of Ill.

[73] Assignee: Sundstrand Corporation, Rockford, Ill.

[21] Appl. No.: 947,611

[22] Filed: Dec. 30, 1986

[51] Int. Cl.⁴ .......................................... H02M 7/219
[52] U.S. Cl. ........................................ 363/89; 363/70; 363/127
[58] Field of Search ................... 363/126, 127, 89, 90, 363/69, 70

[56] References Cited

U.S. PATENT DOCUMENTS

| | | | |
|---|---|---|---|
| 2,642,558 | 6/1953 | Terry et al. | 363/90 |
| 3,040,183 | 6/1962 | Farnsworth | 363/70 X |
| 3,270,270 | 8/1966 | Venisey | 363/86 |
| 4,009,431 | 2/1977 | Johnson | 363/69 X |
| 4,232,363 | 11/1980 | Higuchi et al. | 363/90 X |
| 4,622,629 | 11/1986 | Glennon | 363/89 X |

FOREIGN PATENT DOCUMENTS

| | | | |
|---|---|---|---|
| 0009370 | 1/1985 | Japan | 363/127 |
| 2094520 | 9/1982 | United Kingdom | 363/90 |

Primary Examiner—Patrick R. Salce
Assistant Examiner—Kristine Peckman
Attorney, Agent, or Firm—Wood, Dalton, Phillips, Mason & Rowe

[57] ABSTRACT

A regulated AC/DC converter includes a transformer having a primary winding which receives AC input power and a secondary winding, a rectifier coupled to the secondary winding for rectifying the output of same, a switching circuit coupled to the rectifier for developing trim voltage which is combined with the rectified output of the secondary winding to develop voltage-regulated DC output power and a switch control circuit for controlling the switching circuit whereby the switching circuit develops trim voltage which aids the rectified secondary winding output when such output is below a desired level and which opposes the rectified secondary winding output when such output is above the desired level.

18 Claims, 7 Drawing Sheets

REGULATED AC/DC CONVERTER

TECHNICAL FIELD

The present invention relates generally to power converters, and more particularly to voltage regulated AC/DC power converters.

BACKGROUND ART

Known AC/DC power converters have utilized transformer-rectifier units (TRU's) comprising a transformer having a primary winding which receives input AC power and one or more secondary windings which are coupled to one or more rectifier circuits. The rectified transformer output is thereafter filtered to produce DC output power.

Typically, some sort of regulation scheme is utilized to maintain the DC output voltage within prescribed levels. One type of regulated AC/DC power converter is disclosed in Terry et al U.S. Pat. No. 2,642,558. This power converter includes a transformer having a primary winding coupled to an AC source and multiple secondary windings, one of which is coupled to a rectifier bridge for providing approximately half the desired output voltage at full load. A pair of additional secondary windings are coupled to the anodes of a pair of gas discharge tubes, the cathodes of which are coupled together to an output filter of the device. The gas discharge tubes are fired at a variable point in each half cycle of the AC waveform to in turn supply the proper additive voltage to the output of the full wave bridge so that the output voltage is maintained at a regulated value.

The AC/DC converter disclosed in Terry et al is rather comples in that it uses gas discharge tubes which are unreliable, large, have limited bandwidth and which must be commutated in order to turn off. The latter two factors in turn limit the maximum switching frequency and thereby prevent reduction of the output filter size. The Terry et al converter also requires the use of an auto-transformer separate and apart from the aforementioned transformer, and hence the size and weight of the overall converter are greater than would otherwise be the case if the auto-transformer were not needed. Further, the regulation scheme employed by Terry et al is unidirectional in nature, i.e. regulating voltage is always supplied in additive fashion to the output of the rectifier bridge. This means that the converter must be capable of supplying regulating voltage at a magnitude equal to the largest deviation of the desired output voltage from the voltage developed by the rectifier bridge.

Yenisey U.S. Pat. No. 3,270,270 disclosed a regulated power supply wherein an input AC power source is coupled to a first transformer primary winding. The AC power source is further coupled through a controlled switch to a second primary winding of the transformer. A pair of secondary windings of the transformer are coupled through rectifiers to output terminals of the device. A main portion of the output power is provided through the first primary winding while intermittent or variable power modulated by the controllable power switch is provided through the second primary winding and combined with the main output power to regulate same. In a further embodiment of the power supply, intermittent power is provided through each of a pair of primary windings, one of which adds intermittent power to the unregulated power and the second of which substracts intermittent power from the unregulated power.

The Yenisey device appears to disclose a bidirectional type of converter control; however, this regulation is accomplished on the primary side of the transformer. Inasmuch as the output voltage of the transformer is typically lower than the voltage on the primary side of the transformer, the Yenisey device must utilize power switches having high voltage capability. This requirement may be undesirable in certain circumstances since high-frequency switching devices which would permit a reduction in output filter size typically do not have high voltage capability together with the required current-handling capability. Furthermore, the Yenisey converter requires separate circuits for developing additive power and subtractive power. This unduly duplicates circuitry and increases the cost, size and weight of the converter.

DISCLOSURE OF INVENTION

In accordance with the present invention, a regulated AC/DC converter accomplished bidirectional regulation in a simple fashion so that only a small magnitude of regulating voltage need be developed.

More specifically, the AC/DC converter of the present invention includes a main transformer having a primary winding which receives AC input voltage and a secondary winding, means coupled to the secondary winding for rectifying the output of same, a switching circuit coupled to the rectifying means for developing regulating or trim voltage which is combined with the rectified output of the secondary winding to develop regulated DC output voltage and means for controlling the switching circuit such that the circuit develops trim voltage which aids the rectified secondary winding output when such output is below a desired level and which opposes the rectified secondary winding output when such output is above the desired level.

In a first embodiment of the invention, the switching circuit comprises a synchronous rectifier and a switching converter coupled to the rectifying means wherein each of the synchronous rectifier and the switching converter includes controllable switches operated by the controlling means. The switches are operated so that the switching converter develops supplemental voltage which is coupled by a transformer to the synchronous rectifier which in turn converts the supplemental voltage into the trim voltage.

In a further embodiment of the invention, the switching circuit comprises a synchronous rectifier which is coupled not only to the output of the rectifying means but also to an additional secondary winding of the main transformer. Again, the synchronous rectifier includes controllable switches which are operated by the controlling means so that trim voltage is either added to or subtracted from the output of the rectifying means.

The present converter accomplishes regulation on the secondary side of the transformer, and hence low-voltage, high-current and high-frequency controllable switches may be used. The output filter size may therefore be small. Further, the converter does not require separate circuits for developing additive and subtractive regulating or trim voltage and hence the converter is inherently simple in nature.

BEST MODE FOR CARRYING OUT THE INVENTION

Figure 1:
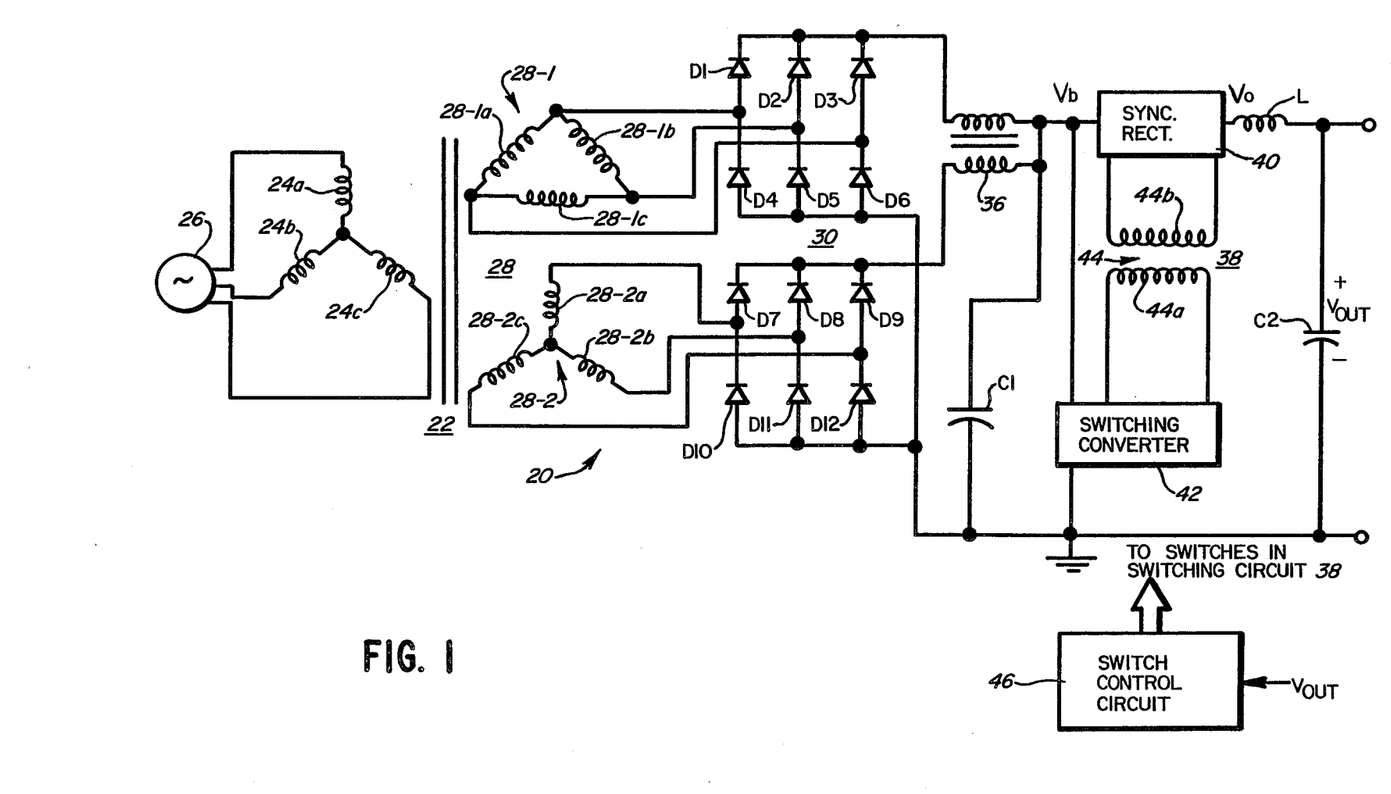
FIG. 1 is a combined schematic and block diagram of the AC/DC converter of the present invention.

Referring now to FIG. 1, there is illustrated an AC/DC power converter 20 according to the present invention. The power converter is of the transformer-coupled type including a transformer 22 having a set of polyphase transformer primary windings 24a–24c coupled to a polyphase AC power supply 26. The AC power supply may alternatively be single-phase, in which case the set of polyphase windings would be replaced by a single winding. The transformer 22 further includes at least one set of polyphase secondary windings, illustrated generally at 28, coupled to a like number of rectifier circuits 30. In the preferred embodiment, there are two sets of secondary windings 28-1 and 28-2 which are connected in delta and wye configurations respectively. The first set of secondary windings 28-1 includes three windings 28-1a, 28-1b and 28-1c which are coupled to junctions between diodes in a full wave bridge rectifier circuit 30-1 comprising diodes D1–D6.

In like fashion, the second set of secondary windings 28-2 includes windings 28-2a, 28-2b and 28-2c which are coupled to the junctions between diodes D7–D12 connected as a full-wave bridge rectifier circuit 30-2.

Again, the sets of polyphase windings may be replaced by single-phase secondary windings, if desired.

Alternatively, the AC power supply 26 and the transformer 22 may be replaced by a different AC source, for example a generator having multiple output windings some or all of which are coupled to the rectifier circuits 30.

The rectifier circuits 30-1 and 30-2 include outputs which are coupled to an interphase transformer 36. The interphase transformer 36 combines the outputs of the rectifier circuits 30-1 and 30-2 to derive unregulated power and the combined output represented by voltage $V_b$ is in turn coupled across a capacitor C1 and to a switching circuit 38 comprising a synchronous rectifier circuit 40 and a switching converter 42. The switching converter 42 is coupled to the synchronous rectifier circuit 40 via a further transformer 44 having first and second windings 44a, 44b.

In the event the transformer includes only one set of secondary windings, the interphase transformer is not necessary and a single rectifier circuit connects the secondary winding(s) to the switching circuit 38.

The switching circuit 38 is in turn coupled to an output filter comprising an inductor L and a capacitor C2. A regulated DC voltage $V_{OUT}$ is developed across the capacitor C2 as noted in greater detail hereinafter.

The output voltage $V_{OUT}$ is coupled to a switch control circuit 46 which in turn controls switches in the switching circuit 38 in accordance with the deviation of the output voltage $V_{OUT}$ from a desired level. The switching circuit 38 is operated by the switch control circuit to develop trim voltage which is combined with the rectified output of the secondary windings to develop regulated DC output voltage.

Figure 2:
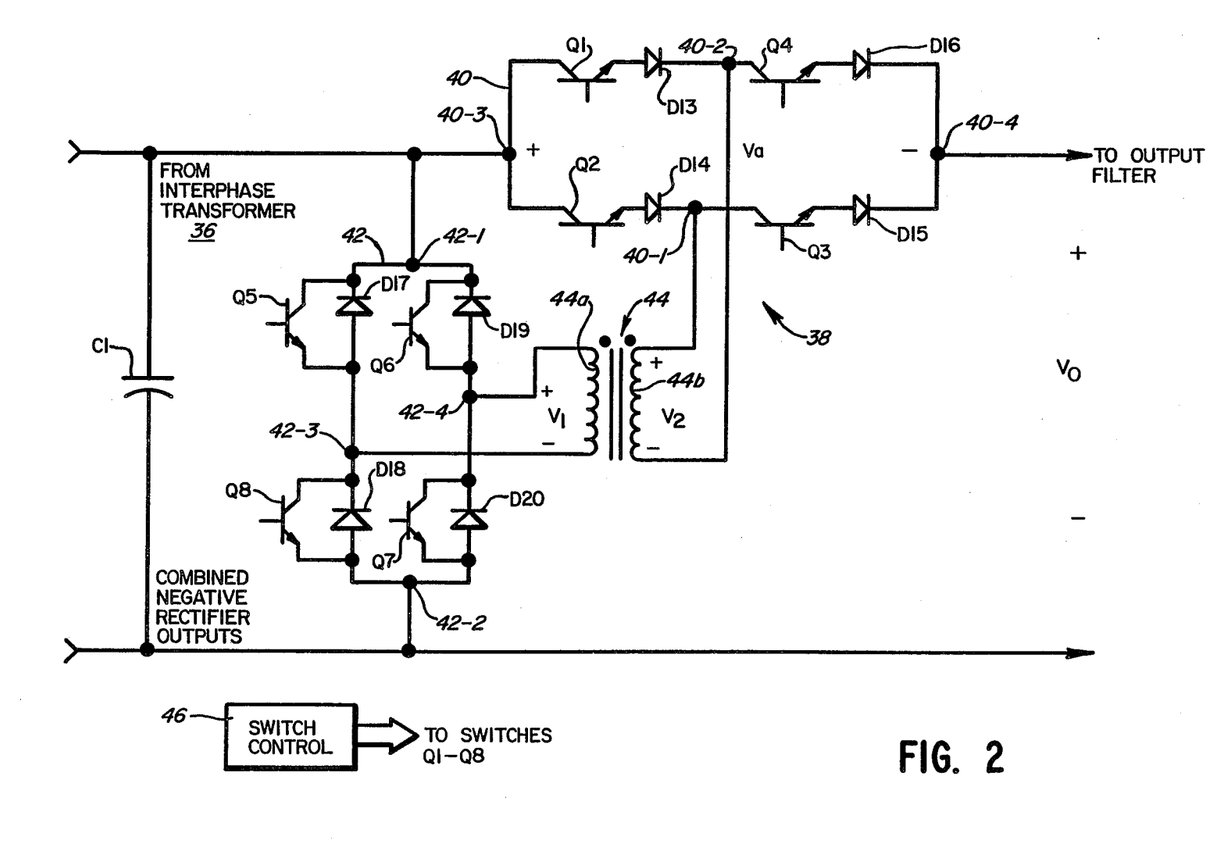
FIG. 2 is a combined schematic and block diagram showing in greater detail the synchronous rectifier and switching regulator illustrated in block diagram form in FIG. 1.

Referring now to FIG. 2, there is is illustrated in greater detail the synchronous rectifier 40 and the switching converter 42. The synchronous rectifier 40 includes four controllable power switches Q1–Q4, which, in the preferred embodiment comprise bipolar transistors. The switches Q1–Q4 are connected in first through fourth arms of a bridge having first and second opposed vertices 40-1, 40-2 and third and fourth opposed vertices 40-3, 40-4 at the junctions between adjacent arms. Diodes D13–D16 are coupled in the four arms of the bridge. The switching converter 42 is coupled via the further transformer 44 to the first and second vertices 40-1,40-2. The interphase transformer 36 is coupled to the third vertex 40-3 while the fourth vertex 40-4 comprises an output of the synchronous rectifier at which a voltage $V_0$ is developed.

The switching converter 42 includes four additional power switches Q5–Q8 and associated anti-parallel diodes D17–D20 which are connected together in four arms of a bridge. First and second vertices 42-1, 42-2 are coupled between the interphase transformer 36 and ground potential while third and fourth vertices 42-3 and 42-4 are coupled across the first winding 44a of the transformer 44. As noted in greater detail below, the switches of the converter 42 are controlled such that the converter 42 acts as an inverter to develop supplemental voltage which is coupled by the transformer 44 to the synchronous rectifier 40. The rectifier 40 converts the supplemental voltage into the trim voltage which is combined with the rectified output of the secondary winding 28-1 and 28-2 to derive combined voltage.

Figure 3:
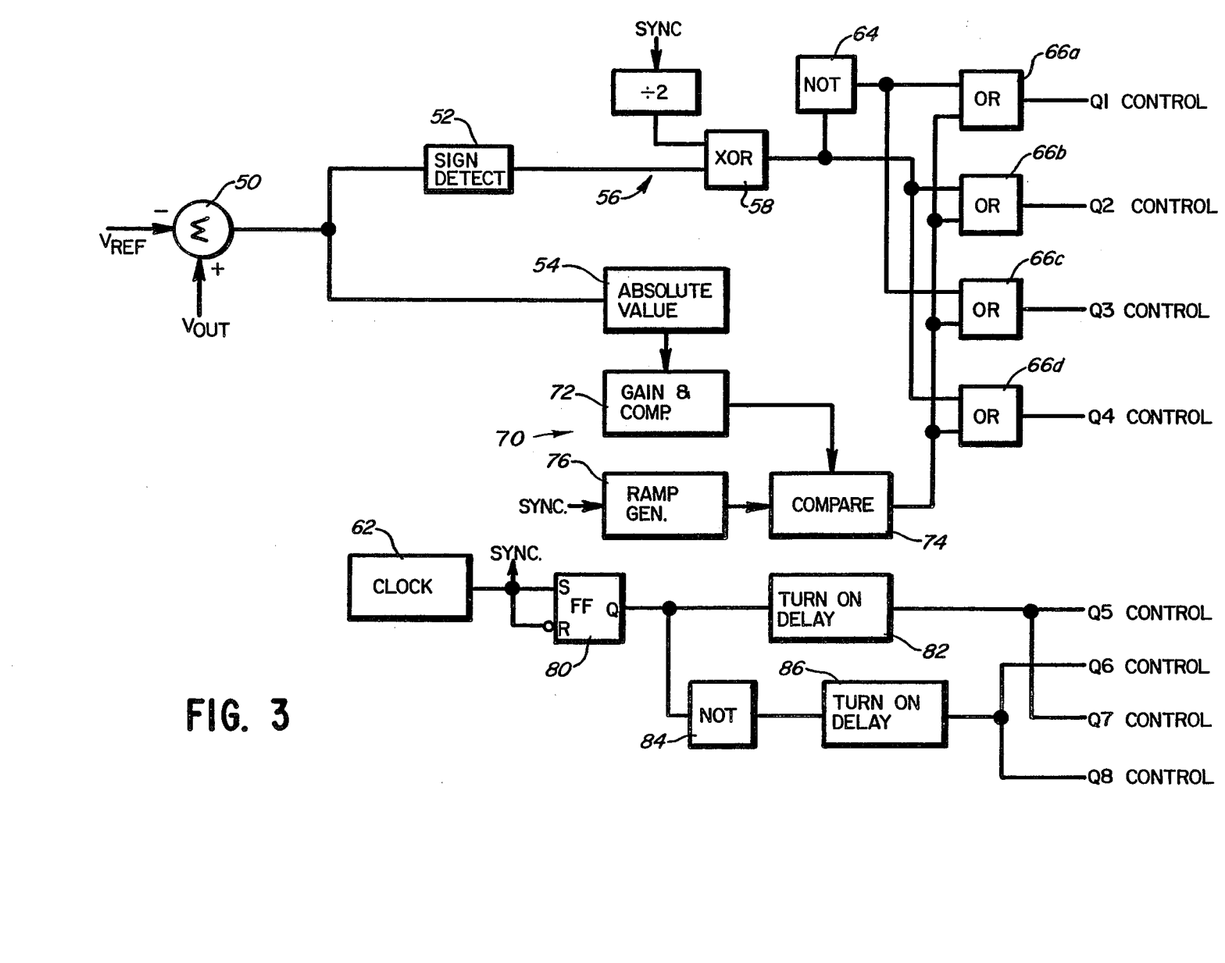
FIG. 3 is a block diagram of the switch control illustrated in FIG. 2.

The switch control 46, illustrated in greater detail in FIG. 3, includes means, in the form of a summing junction 50, for developing an error signal representing the deviation of the actual DC output voltage $V_{OUT}$ from a desired or reference value $V_{REF}$. The error signal is coupled to a sign detect circuit 52 and to an absolute value circuit 54. The output of the sign detect circuit 52 is in a high or one state when the voltage $V_{OUT}$ is greater than the reference voltage and is in a zero or low state when the output voltage $V_{OUT}$ is less than the reference voltage $V_{REF}$. The sign detect circuit 52 is coupled to a logic circuit 56 which determines the switching sequence of the transistors Q1–Q4 by turning on opposing pairs Q1,Q3 or Q2,Q4 alternately in synchronism with the switches Q5–Q8 of the switching converter 42. The sign detect input to this circuit 56 determines whether the switches Q1–Q4 are activated so as to apply a voltage in addition to the voltage $V_b$ or in the opposite sequence to apply a voltage to subtract from the voltage $V_b$. The logic circuit 56 includes an EXCLUSIVE OR gate 58 which receives the output of the sign detect circuit 52 and the output of a divide-by-two circuit 60. The circuit 60 in turn receives a synchronizing signal SYNC developed by a clock circuit 62. The output of the EXCLUSIVE OR gate 58 is coupled to a NOT gate 64. The output of the NOT gate 64 is coupled to first inputs of a pair of OR gates 66a, 66c while the output of the EXCLUSIVE OR gate 58 is coupled to first inputs of a further pair of OR gates 66b,66d.

A second input of each of the OR gates 66a–66d receives signals from a pulse-width modulation circuit 70. The pulse-width modulation circuit includes a gain and compensation network 72 which receives the output of the absolute value circuit 54 and a comparator 74 having a first input coupled to the network 72 and a second input which receives the output of a ramp generator 76. The ramp generator 76 in turn receives the SYNC signal from the clock 62.

When the absolute value of the deviation of the output voltage $V_{OUT}$ from the reference voltage $V_{REF}$ is less than a certain amount, the pulse-width modulation circuit 70 provides a pulse-width modulated waveform to each of the OR gates 66a–66d so that the power switches Q1–Q4 are operated in a pulse-width mode of operation. Less-than-maximum voltage boosting or bucking of the voltage $V_b$ is thereby accomplished.

The clock 62 is coupled in noninverted and inverted form to set and reset inputs, respectively, of a flip-flop 80. The output of the flip-flop 80 is coupled to a turn-on delay circuit 82 which in turn controls the on/off state of the switches Q5,Q7. The output of the flip-flop 80 is also coupled through an inverter 84 to a second turn-on delay circuit 86 which in turn controls the on/off state of the switches Q6, Q8.

The turn-on delay circuits 82,86 insure that there is a short dead-band period between conduction of the switches Q5,Q7 and conduction of the switches Q6, Q8.

Figure 4:
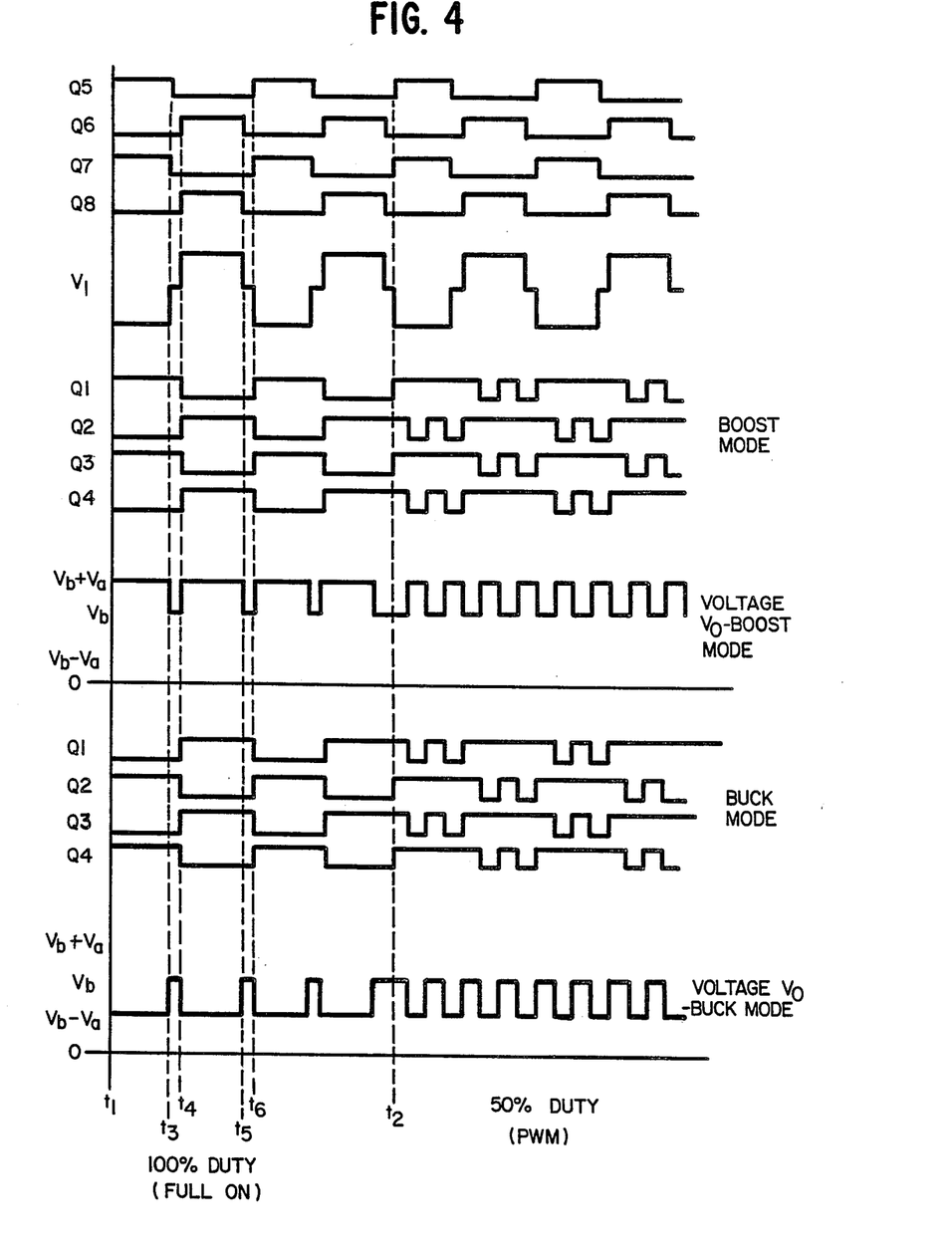
FIG. 4 is a series of waveform diagrams illustrating the operation of the embodiment shown in FIGS. 1-3 for 100% duty cycle and 50% duty cycle.

Referring now to the waveforms of FIG. 4, the embodiment illustrated in FIGS. 2 and 3 will be described for the case where the switches in the synchronous rectifier 40 are operated at 100% duty cycle, i.e. in a full-on mode, and for the case where the switches are subsequently operated at 50% duty cycle.

The clock 62 is operated at a constant frequency preferably between 20 khz and 100 khz and produces pulses which are processed by the flip-flop 80, the inverter circuit 84 and the turn-on delay circuits 82, 86 to control the switches Q5–Q8 in the illustrated manner. As noted previously, the turn-on delay circuits 82,86 interpose a short delay period between turn off of the switches Q5,Q7 and turn on of the switches Q6,Q8, and vice versa. The switching sequence illustrated in FIG. 4 results in a stepped voltage waveform $V_1$ across the first winding 44a of the transformer 44. This voltage $V_1$ induces a voltage $V_2$ (not shown in FIG. 4) across the winding 44b which ideally is identical to the waveform $V_1$ except that the magnitude of $V_2$ is less than the magnitude of $V_1$. When the voltage $V_b$ at the output of the interphase transformer 36 is less than that required to produce the desired output voltage, the switches Q1–Q4 are operated to connect the high voltage side of the second winding 44b to the vertex 40-4 while the low voltage side of the winding 44b is connected to the vertex 40-3. In addition, the switches Q1–Q4 are operated to provide the proper additive or boosting voltage to be combined with the voltage $V_b$. The maximum level of the boosting (or bucking) voltage is determined by the turns ratio of the transformer 44. When the voltage $V_b$ is at a sufficiently low level such that the boosting voltage must be at its maximum level, the switches Q1–Q4 are operated in the full-on mode as shown between times $t=t_1$ and $t=t_2$.

When the voltage $V_b$ at the output of the interphase transformer 36 is greater than that required to produce the desired output voltage, the switches Q1–Q4 are operated in a sequence which connects the high voltage side of the second winding 44b to the vertex 40-3 while the low voltage side of the winding 44b is connected to the vertex 40-4. In addition, the switches Q1–Q4 are operated to provide the proper substractive or bucking voltage to be combined with the voltage $V_b$. When the voltage $V_b$ is at a sufficiently high level such that the bucking voltage must be at its maximum level, the switches Q1–Q4 are operated in the full-on mode as illustrated by the waveform representing the voltage $V_0$ in the bucking mode between the times $t_1$ and $t_2$.

The notches in the waveforms illustrated the voltage $V_0$ in the boost and buck modes are due to the deadband imposed by the turn-on delay circuits 82,86.

More specifically, between time $t_1$ and a time $t_3$, the switches Q5 and Q7 are on while the switches Q6 and Q8 are off. This impresses a voltage level of negative polarity (with respect to the polarity illustrated in FIG. 2) across the primary winding 44a of the transformer 44 which is approximately equal to the voltage $V_b$.

At the time $t_3$, the switches Q5 and Q7 are turned off. This removes the voltage across the windings 44a until a time $t_4$, at which time the switches Q6 and Q8 are turned on. A positive potential is then applied across the winding 44a until the switches Q6 and Q8 are subsequently turned off at a time $t_5$. At this time, the impressed voltage across the winding 44a is removed.

During operation in the boost mode, when the voltage $V_2$ induced across the secondary winding 44b is of the polarity shown in FIG. 2, i.e. between times $t_1$ and $t_3$, the switches Q1 and Q3 are operated while the switches Q2 and Q4 are maintained in an off condition. This additively places a potential $V_a$ in series with the voltage $V_b$. The switches Q1 and Q3 remain on until the time $t_4$, at which point these switches are turned off and the switches Q2 and Q4 are turned on. Between the time $t_4$ and the time $t_5$, the waveform $V_1$ is positive in polarity (again with reference to the polarity illustrated in FIG. 2), and hence the switches Q2 and Q4 are operated until a time $t_6$, at which time the polarity of the waveform $V_1$ again becomes negative.

When the voltage $V_b$ is greater than the desired output voltage such that operation occurs in the buck mode, a subtractive voltage must be combined with the voltage $V_b$. In this case, the switching sequence for the switches Q1 and Q3 corresponds to that illustrated for switches Q2 and Q4 in the boost mode while the switching sequence for the switches Q2 and Q4 in the buck mode corresponds to the switching sequence of the switches Q1 and Q3 in the boost mode.

As is evident from the waveform diagram illustrating the voltage $V_0$ in the buck mode, the voltage shifts between voltage levels $V_b$ and $V_b-V_a$ instead of between voltage levels $V_b$ and $V_b+V_a$, as was the case during operation in the boost mode. The voltage $V_0$ is filtered by the output filter to produce a substantially constant voltage $V_{OUT}$ equal to the desired voltage.

As previously noted, when less-than-maximum boosting or bucking of the voltage $V_b$ is required, the switches are operated in the pulse-width modulated (PWM) mode of operation. While in the PWM mode, for example subsequent to the time $t_2$, the comparator 74, FIG. 3, develops a pulse-width modulated waveform which is coupled by the OR gates 66a–66d to the switches Q1–Q4 so that all of the switches are periodically turned on. When all of the switches Q1–Q4 are on, the voltage $V_b$ is passed directly to the output of the synchronous rectifier 40. This bypassing permits a variable boost/buck regulation scheme to be implemented. In fact, the widths of the pulses developed by the comparator 74 are infinitely variable to in turn allow accurate dynamic voltage regulation.

Figure 5:
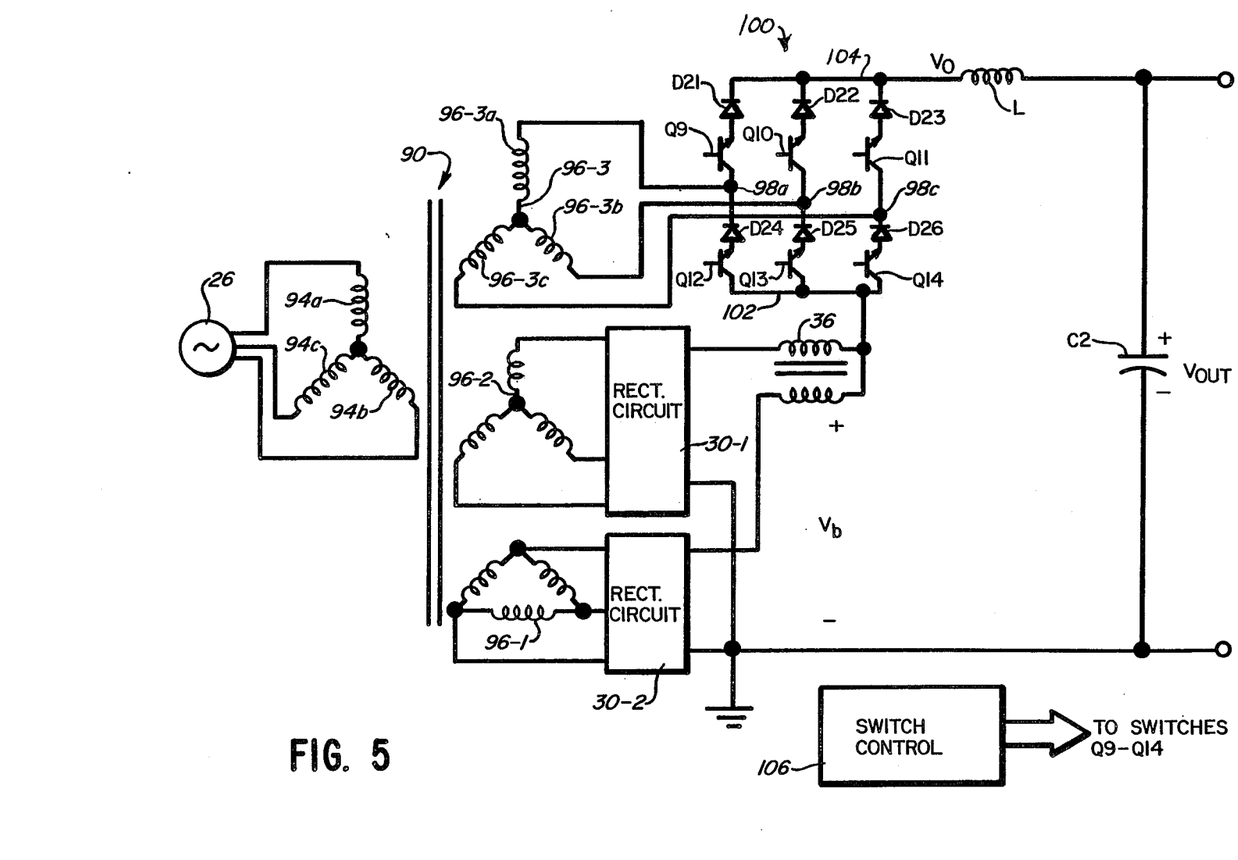
FIG. 5 is a combined schematic and block diagram of a further embodiment of the invention.

Referring now to FIG. 5, there is illustrated an alternative embodiment of the invention. Elements common among the various figures are assigned like reference numerals.

In this embodiment, the transformer 22 is replaced by a transformer 90 having a set of primary windings 94a-94c coupled to the AC power supply 26 and first, second and third sets of secondary windings 96-1, 96-2 and 96-3, respectively. The windings 96-1, 96-2 are identical to the coupled to the rectifier circuits 30-1, 30-2 and to the interphase transformer 36. The set of windings 96-3 includes windings 96-3a, 96-3b, 96-3c connected in wye configuration which are coupled to junctions 98a, 98b, 98c between series-connected pairs of power switches in the form of transistors Q9-Q14 which together comprise a switching circuit in the form of a synchronous rectifier 100. Diodes D21-D26 are provided in series with the emitters of the transistors Q9-Q14. The series-connected pairs of power switches are connected together in parallel at first and second nodes 102, 104. The node 102 is coupled to the interphase transformer 36 while the node 100 is coupled to the output filter comprising the inductor L and the capacitor C.

Again, the set of windings 96-3 may be replaced by a single-phase winding, in which case the winding would be coupled between two series pairs of switches in the synchronous rectifier 100.

Figure 6:
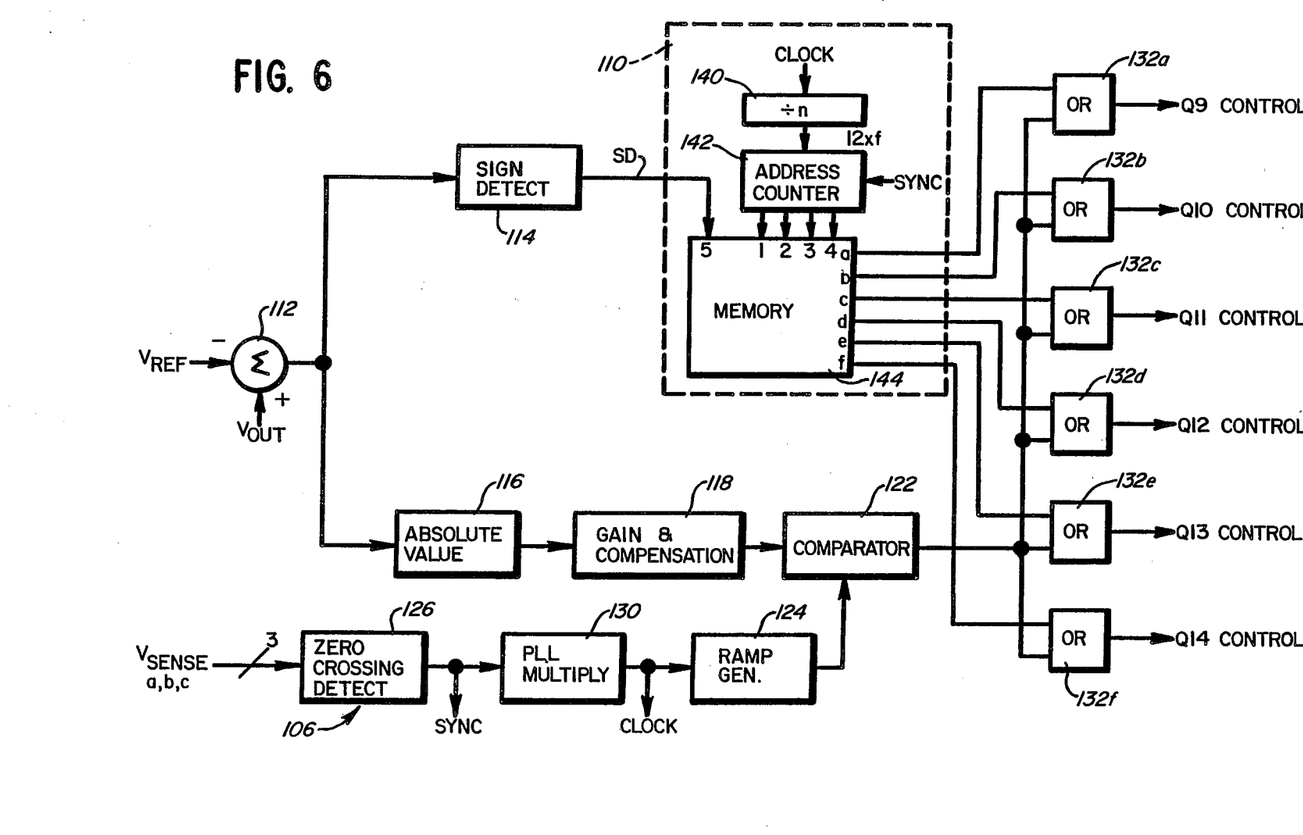
FIG. 6 is a block diagram of the switch control illustrated in FIG. 5.

The switches Q9-Q13 are operated by a switch control circuit 106 to develop trim voltage which is combined with the rectified output of the secondary windings to develop combined voltage. As seen in FIG. 6, the control circuit 106 includes a switch pattern selection circuit 110 which, in the preferred embodiment, includes logic circuits and a memory for developing switch patterns to operate the switches Q9-Q14 in proper sequence. The switch pattern selection circuit 110 receives inputs from a summing junction 112 and a sign detection circuit 114 similar to the circuits 50, 52 illustrated in FIG. 3.

A PWM mode of operation of the switches Q9-Q14 is implemented in part by an absolute value circuit 116, a gain and compensation circuit 118 and a comparator 122. The comparator 122 receives the output of the gain and compensation circuit 118 and a ramp signal generated by a ramp generator 124. The ramp generator 124 is in turn controlled by a zero crossing detection circuit 126 which develops a pulse every time one of the phase outputs of the transformer windings 90-3a through 90-3c passes through a zero voltage level. These pulses are coupled through a phase-locked loop (PLL) multiplier 130 which multiplies the frequency of the output of the zero crossing detection circuit 126 to derive a train of pulses at a desired frequency. In the preferred embodiment, this desired frequency is between 20 khz and 100 khz, although a different frequency may be utilized. In effect, the circuits 126 and 130 together comprise a clock circuit similar to the clock 62 of FIG. 3. The zero crossing detection circuit 126 develops a synchronizing signal SYNC and the PLL multiplier 130 develops a clock signal CLOCK, both of which are coupled to the selection circuit 110.

The ramp generator 124 develops a ramp waveform at the same frequency as the output from the PLL multiplier 130 and this ramp waveform is compared by the comparator 122 against the output of the gain and compensation circuit 118. The comparator 122 is coupled to an input of each of a series of OR gates 132a-132f which in turn develop control signals for operating the switches Q9-Q14. A further input of each of the OR gates 132a-132f is obtained from the switch pattern selection circuit 110. When the error signal from the gain and compensation circuit is greater than a certain level, the output of the comparator 122 is in a low state. On the other hand, when this error signal is less than the certain level, the comparator 122 develops a pulse-width modulated waveform which is combined by the OR gates 132a-132f with the outputs of the switch pattern selection circuit 110 to develop PWM control signals for the switches Q9-Q14.

The switch pattern selection circuit 110 includes a divide-by-n counter 140 which is responsive to the clock signal from the multiplier 130 to produce a signal at a frequency equal to twelve times the fundamental frequency f of the AC power source. An address counter 142 receives the signal from the divide-by-n counter 140 and the SYNC signal from the zero crossing detector circuit 126 and develops four outputs which are coupled to memory address inputs 1-4 of a memory 144. The SYNC signal periodically resets the address counter 142 when one phase of the AC source passes through zero. An input 5 of one memory 144 receives the sign detect signal SD developed by the sign detection circuit 114. In the preferred embodiment, the memory 144 develops binary signals at outputs a-f according to the following table:

| | MEMORY CONTENT | | | | | | | | | |
|---|---|---|---|---|---|---|---|---|---|---|
| | ADDRESS | | | | OUTPUT | | | | | |
| SD | 1 | 2 | 3 | 4 | a | b | c | d | e | f |
| 0 | 0 | 0 | 0 | 0 | 0 | 0 | 1 | 0 | 1 | 0 |
| 0 | 0 | 0 | 0 | 1 | 1 | 0 | 0 | 0 | 1 | 0 |
| 0 | 0 | 0 | 1 | 0 | 1 | 0 | 0 | 0 | 1 | 0 |
| 0 | 0 | 0 | 1 | 1 | 1 | 0 | 0 | 0 | 0 | 1 |
| 0 | 0 | 1 | 0 | 0 | 1 | 0 | 0 | 0 | 0 | 1 |
| 0 | 0 | 1 | 0 | 1 | 0 | 1 | 0 | 0 | 0 | 1 |
| 0 | 0 | 1 | 1 | 0 | 0 | 1 | 0 | 0 | 0 | 1 |
| 0 | 0 | 1 | 1 | 1 | 0 | 1 | 0 | 1 | 0 | 0 |
| 0 | 1 | 0 | 0 | 0 | 0 | 1 | 0 | 1 | 0 | 0 |
| 0 | 1 | 0 | 0 | 1 | 0 | 0 | 1 | 1 | 0 | 0 |
| 0 | 1 | 0 | 1 | 0 | 0 | 0 | 1 | 1 | 0 | 0 |
| 0 | 1 | 0 | 1 | 1 | 0 | 0 | 1 | 0 | 1 | 0 |
| 1 | 0 | 0 | 0 | 0 | 0 | 1 | 0 | 0 | 0 | 1 |
| 1 | 0 | 0 | 0 | 1 | 0 | 1 | 0 | 1 | 0 | 0 |
| 1 | 0 | 0 | 1 | 0 | 0 | 1 | 0 | 1 | 0 | 0 |
| 1 | 0 | 0 | 1 | 1 | 0 | 0 | 1 | 1 | 0 | 0 |
| 1 | 0 | 1 | 0 | 0 | 0 | 0 | 1 | 1 | 0 | 0 |
| 1 | 0 | 1 | 0 | 1 | 0 | 0 | 1 | 0 | 1 | 0 |
| 1 | 0 | 1 | 1 | 0 | 0 | 0 | 1 | 0 | 1 | 0 |
| 1 | 0 | 1 | 1 | 1 | 1 | 0 | 0 | 0 | 1 | 0 |
| 1 | 1 | 0 | 0 | 0 | 1 | 0 | 0 | 0 | 1 | 0 |
| 1 | 1 | 0 | 0 | 1 | 1 | 0 | 0 | 0 | 0 | 1 |
| 1 | 1 | 0 | 1 | 0 | 1 | 0 | 0 | 0 | 0 | 1 |
| 1 | 1 | 0 | 1 | 1 | 0 | 1 | 0 | 0 | 0 | 1 |

As noted in greater detail below, the digital signals developed at the outputs a-f operate the switches Q9-Q14 to maintain the output voltage at the desired level.

Referring now to the waveform diagrams of FIG. 7, the operation of the converter illustrated in FIGS. 5 and 6 will be explained first under the assumption that maximum regulating voltage need be provided by the synchronous rectifier 100 between times $t_7$ and $t_8$ so that the switches Q9-Q14 are operated in the full-on mode. The switch control waveforms for the switches Q9–Q14 are stored in the switch pattern selection circuit 110. The waveforms cause operation of only two of the switches at any particular time such that the largest phase voltage difference between two of the three phases is applied across the nodes 102,104. That is, for example, between times $t_7$ and $t_9$, the largest phase voltage difference exists between phases B and C. When in the boost mode, the switches Q11 and Q13 are operated during this time to apply this phase voltage difference in additive fashion across the synchronous rectifier 100. When operating in the buck mode, the switches Q10 and Q14 are operated so that this voltage is applied in substractive fashion across the synchronous rectifier 100.

Between times $t_9$ and $t_{10}$, the largest phase voltage difference is between phases A and B. Hence, while operating in the boost mode, the switches Q9 and Q13 are turned on. During operation in the buck mode, this phase voltage difference is applied in a reverse direction across the synchronous rectifier 100 by turning on the switches Q10 and Q12.

Figure 7:
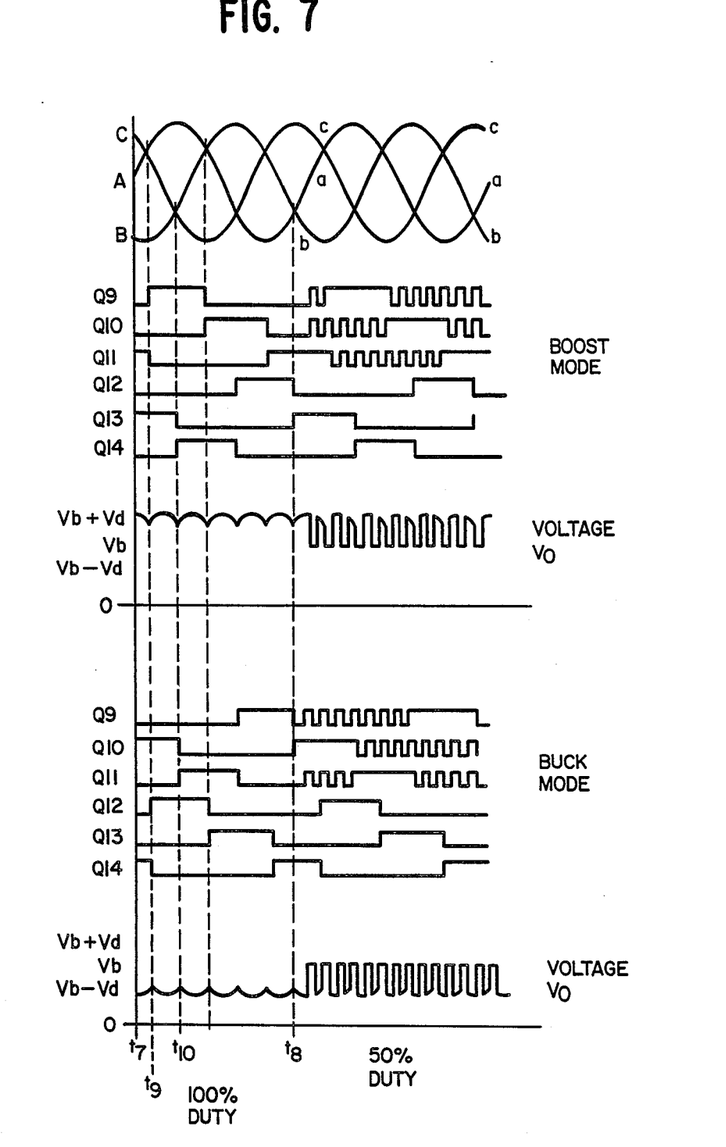
FIG. 7 is a series of waveform diagrams illustrating the operation of the embodiment shown in FIGS. 5 and 6 for 100% duty cycle and 50% duty cycle.

The switching sequence continues as shown in FIG. 7 to couple the largest phase voltage difference across the synchronous rectifier 100. The resulting voltage $V_0$ during operation in the boost mode is approximately equal to the voltage $V_b$ at the output of the interphase transformer 36 plus a voltage $V_d$ developed across the synchronous rectifier 100. The voltage $V_0$ in the buck mode is approximately equal to $V_b - V_d$. The voltage $V_0$ when no pulse width modulation is occurring comprises a substantially constant DC level except for a small magnitude of ripple which is filtered by the output filter comprising the elements L and C2.

Subsequent to the time $t_8$, it is assumed that the voltage $V_b$ at the output of the interphase transformer 36 is sufficiently close to the desired output voltage $V_0$ such that maximum regulation is not required. In this case, the switches Q9–Q14 are again operated in the PWM mode so that the proper regulating voltage is combined with the voltage $V_b$ to maintain the voltage $V_{OUT}$ at the desired level. As seen at times subsequent to time $t_8$, the comparator 122 develops a waveform which is coupled to each of the OR gates 132a–132f to periodically turn on all of the switches Q9–Q11. During the times that all of the switches S9–Q11 are on, the synchronous rectifier 100 is bypassed completely so that the voltage $V_b$ is passed directly to the output thereof. The on times for the switches Q9–Q14 are identical to the case where the switches are not operated in the PWM mode. It is only when the switches Q9–Q11 would otherwise be off that these switches are turned on to bypass the synchronous rectifier 100.

The resulting voltage $V_0$ when in the PWM mode appears as a notched waveform which is filtered by the output filter comprising the elements L and C2 to develop the DC output voltage $V_{OUT}$.

It should be noted that the switch pattern selection circuit 110 may additionally or alternatively develop switching patterns which couple a phase voltage difference across the synchronous rectifier 100 which is less than the greatest phase voltage difference. If the circuit 110 is capable of developing both types of switching patterns, an additional input may be provided to the circuit 110 to cause it to develop the greatest phase voltage difference across the rectifier 100 when the boosting or bucking voltage must be above a certain level and to cause the circuit 110 to develop a lesser phase voltage difference across the rectifier 100 when the boosting or bucking voltage must be below the certain level.

As should be evident from the foregoing description, the converter of the present invention need only provide regulating voltage suitable for half the full range of transient voltage.

Moreover, it should further be noted that the use of the pulse-width modulation technique can be used to compensate for low frequency ripple at the output of the interphase transformer which in turn allows the output filter size to be reduced.

We claim:

1. A regulated AC/DC converter for converting AC input power developed by an AC power source into voltage-regulated DC output power, comprising:
   means coupled to the AC power source for rectifying the output of same;
   a switching circuit operable substantially only when the rectified AC power source output varies from a desired level and coupled to the rectifying means for developing trim voltage which is combined with the rectified output of the AC power source to develop the voltage-regulated DC output power; and
   means for controlling the switching circuit whereby the circuit develops trim voltage which aids the rectified AC power source output when such output is below the desired level and which opposes the rectified AC power source output when such output is above the desired level.

2. The converter of claim 1, wherein the switching circuit includes a synchronous rectifier and a switching converter coupled to the rectifying means, each of the synchronous rectifier and the switching converter including controllable switches operated by the controlling means.

3. The converter of claim 2, wherein the controlling means includes means for developing an error signal representing the deviation of the output voltage of the converter from a reference and means for operating the switches in the synchronous rectifier in a pulse-width modulated mode in dependence upon the absolute value of such deviation.

4. The converter of claim 2, wherein the synchronous rectifier comprises a bridge having first through fourth arms in which are connected first through fourth controllable switches, respectively.

5. The converter of claim 4, wherein the bridge further includes first and second opposed vertices and third and fourth opposed vertices at the junctions between the arms of the bridge and the rectified AC power source is connected to the third vertex, the switching converter is connected to the first and second vertices and the fourth vertex comprises an output of the synchronous rectifier.

6. The converter of claim 2, wherein the switching converter comprises an inverter coupled to the rectifying means and including a further transformer having a first winding coupled to the inverter and a second winding coupled to the synchronous rectifier.

7. The converter of claim 1, wherein the AC power source comprises an AC power supply coupled to a transformer having one secondary winding coupled to the rectifying means and a further secondary winding wherein the switching circuit is connected to the further secondary winding.

8. The converter of claim 7, wherein the switching circuit comprises a synchronous rectifier including controllable switches coupled to the further secondary winding.

9. The converter of claim 8, wherein the switches are connected as series pairs and the series pairs are connected in parallel and wherein the further secondary winding is connected between two series pairs.

10. The converter of claim 9, wherein the series pairs are connected together at first and second nodes whereby the first node is coupled to the rectifying means and the second node comprises an output of the synchronous rectifier and wherein the switches of each pair are connected at a junction therebetween and the secondary winding is connected between the junctions of two series pairs.

11. The converter of claim 1, wherein the AC source comprises an AC power supply coupled to a transformer.

12. The converter of claim 1, wherein the AC source comprises a generator coupled to the rectifying means.

13. A regulated AC/DC converter for converting AC input power into voltage-regulated DC output power, comprising:
   a transformer having a primary winding which receives the AC input power and first and second secondary windings;
   first and second rectifier circuits coupled to the first and second secondary windings, respectively, for rectifying the power developed therein;
   means coupled to the rectifier circuits for combining the rectified power developed by the first rectifier circuit with the rectified power developed by the second rectifier circuit to thereby derive unregulated voltage;
   a synchronous rectifier coupled to the combining means having controllable power switches operable substantially only when the rectified secondary winding output varies from a desired level;
   means for controlling the controllable switches so that the synchronous rectifier develops trim voltage which is combined with the unregulated voltage to derive combined voltage whereby the trim voltage boosts the unregulated voltage when such unregulated voltage is less than a reference and bucks the voltage when the unregulated voltage is greater than the reference; and
   means coupled to the synchronous rectifier for filtering the combined voltage to derive the voltage-regulated DC output power.

14. The converter of claim 13, further including a switching converter coupled to the combining means and to the synchronous rectifier for providing supplemental voltage to the synchronous rectifier whereby the controlling means operates the controllable switches to convert the supplemental voltage into the trim voltage.

15. The converter of claim 14, wherein the switching converter comprises an inverter coupled to the combining means and further including a further transformer coupled between the inverter and the synchronous rectifier.

16. The converter of claim 13, wherein the transformer includes a third secondary winding and wherein the switches of the synchronous rectifier are connected to the third secondary winding and to the combining means.

17. The converter of claim 16, wherein the transformer includes a set of three further secondary windings of the three-phase, wye-connected type and the switches of the synchronous rectifier comprise six transistors connected in a bridge configuration wherein three series-connected pairs of transistors are connected together in parallel at first and second nodes coupled to the combining means and to the filtering means, respectively, and wherein each of the series-connected pairs includes a junction between the transistors of such pair which is coupled to one of the three further secondary windings.

18. The converter of claim 13, wherein the controlling means includes means for developing an error signal representing the deviation of an output parameter of the converter from a reference and means for operating the switches in the synchronous rectifier in a pulse-width modulated mode in dependence upon the absolute value of such deviation.

* * * * *